(12) United States Patent
Kang

(10) Patent No.: US 7,628,025 B2
(45) Date of Patent: Dec. 8, 2009

(54) METHOD OF OPERATING REFRIGERATOR

(75) Inventor: Myoung Ju Kang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 11/275,745

(22) Filed: Jan. 26, 2006

(65) Prior Publication Data
US 2007/0256438 A1  Nov. 8, 2007

(30) Foreign Application Priority Data
Jan. 26, 2005  (KR) .................... 10-2005-0007110

(51) Int. Cl.
*F25B 5/00* (2006.01)
*F25B 1/10* (2006.01)
(52) U.S. Cl. .......................... 62/199; 62/504
(58) Field of Classification Search .............. 62/199, 62/196.1, 197, 504, 524, 525
See application file for complete search history.

(56) References Cited

FOREIGN PATENT DOCUMENTS

KR  2002057702 A  *  7/2002

* cited by examiner

*Primary Examiner*—Chen-Wen Jiang
(74) *Attorney, Agent, or Firm*—Fish & Richardson P.C.

(57) ABSTRACT

A method of operating a refrigerator is disclosed, by which a silent operation of the refrigerator is enabled. The present invention includes a step (a) of controlling a flow of a refrigerant so that the refrigerant can be introduced into at least one accumulator connected to at least one evaporator selected to be driven and a step (b) of if a compressor stops being driven, switching the flow of the refrigerant so that the refrigerant can be introduced into at least one different accumulator connected to at least one different evaporator to which the flow of the refrigerant was cut off in the course of driving the compressor.

14 Claims, 6 Drawing Sheets

METHOD OF OPERATING REFRIGERATOR

This application claims the benefit of the Korean Patent Application No. P2005-07110, filed on Jan. 26, 2005, which is hereby incorporated by reference as if fully set forth herein.

BACKGROUND OF THE INVENTION

1. Field of the Invention

The present invention relates to a method of operating a refrigerator. Although the present invention is suitable for a wide scope of applications, it is particularly suitable for noise reduction.

2. Discussion of the Related Art

Generally, a refrigerator is an appliance for keeping freshness of food for a long term regardless of seasons.

For this, a general refrigerator is provided with a compressor, condenser, evaporator and expander configuring a cooling cycle.

In particular, a refrigerant sequentially passes through the compressor, condenser, expander and evaporator to undergo phase changes. And, an inside of the refrigerator is kept at low temperature by the phase changes of the refrigerant.

In this case, the refrigerator includes a cabinet configuring an exterior of the refrigerator. And, an accumulator is further provided to the cabinet as well as the compressor, condenser, expander and evaporator.

At least one storeroom is provided within the cabinet to store food. As an inside of the cabinet, and more particularly, an inner space of the storeroom is kept at low temperature by the evaporator, the freshness of food preserved within the storeroom can be sustained for a considerably long term.

The accumulator is provided between the evaporator and an intake end of the compressor to prevent a liquid phase of the refrigerant discharged from the evaporator from being sucked into the compressor.

Recently, a plurality of evaporators are provided to the cabinet of the refrigerator and a plurality of storerooms partitioned from one another are provided within the cabinet. Hence, temperatures of the storerooms are independently adjusted by a plurality of the evaporators, respectively.

And, the accumulator is connected to each of a plurality of the evaporators to prevent the liquid refrigerant contained in the refrigerant discharged from the evaporator from being sucked into the compressor. Hence, performance reduction of the compressor is prevented.

As the refrigerator including a plurality of the evaporators and a plurality of the accumulators is installed within an indoor space to use, it is preferable to minimize noise generating factors.

Hence, the demand for a refrigerator operating method that minimizes the noise generation rises for a silent operation of the refrigerator.

SUMMARY OF THE INVENTION

Accordingly, the present invention is directed to a method of operating a refrigerator that substantially obviates one or more problems due to limitations and disadvantages of the related art.

An object of the present invention is to provide a method of operating a refrigerator, by which a silent operation of the refrigerator is enabled.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of operating a refrigerator according to the present invention includes a step (a) of controlling a flow of a refrigerant so that the refrigerant can be introduced into at least one accumulator connected to at least one evaporator selected to be driven and a step (b) of if a compressor stops being driven, switching the flow of the refrigerant so that the refrigerant can be introduced into at least one different accumulator connected to at least one different evaporator to which the flow of the refrigerant was cut off in the course of driving the compressor.

Preferably, the method further includes a step (c) of deciding whether the compressor stops and a step (d) of detecting the evaporator to which the refrigerant is introduced in the course of driving the compressor.

Preferably, the step (b) is carried out by a valve provided between a condenser and each of a plurality of the evaporators to switch the flow of the refrigerant.

More preferably, the step (b) is carried out in a manner of enabling a pipe connected to a discharging end of the condenser to selectively communicate with another pipes connected to intake ends of a plurality of the evaporators, respectively.

Preferably, the step (b) is carried out in a manner of cutting off the refrigerant introduced into the selected evaporator in the course of driving the compressor and opening a passage to the evaporator to which the flow of the refrigerant was cut off in the course of driving the compressor.

More preferably, the step (b) includes a step (b1) of cutting off the refrigerant introduced into the selected evaporator in the course of driving the compressor and a step (b2) of opening the passage to the evaporator to which the flow of the refrigerant was cut off in the course of driving the compressor.

Preferably, the method further includes the steps of deciding whether the compressor is driven by detecting states of a plurality of storerooms provided with the evaporators prior to the step (a) and selecting at least one of the evaporators needing to be driven.

In another aspect of the present invention, a method of operating a refrigerator, which includes a plurality of storerooms wherein at least one of a plurality of the storerooms is a ripening storeroom storing food to be ripened, includes a step (a) of controlling a flow of a refrigerant so that the refrigerant can be introduced into at least one accumulator connected to at least one evaporator adjusting a temperature of at least one of a plurality of the storerooms and a step (b) of if a compressor stops being driven, switching the flow of the refrigerant so that the refrigerant can be introduced into at least one different accumulator connected to at least one different evaporator to which the flow of the refrigerant was cut off in the course of driving the compressor.

Therefore, the refrigerator operating method is more effective to a refrigerator having a plurality of storerooms, in which at least one of a plurality of the storerooms is a ripening storeroom that stores food needing to be ripened.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a refrigerator driven by a refrigerator operating method according to one embodiment of the present invention is explained with reference to FIG. 1 as follows.

Figure 1:
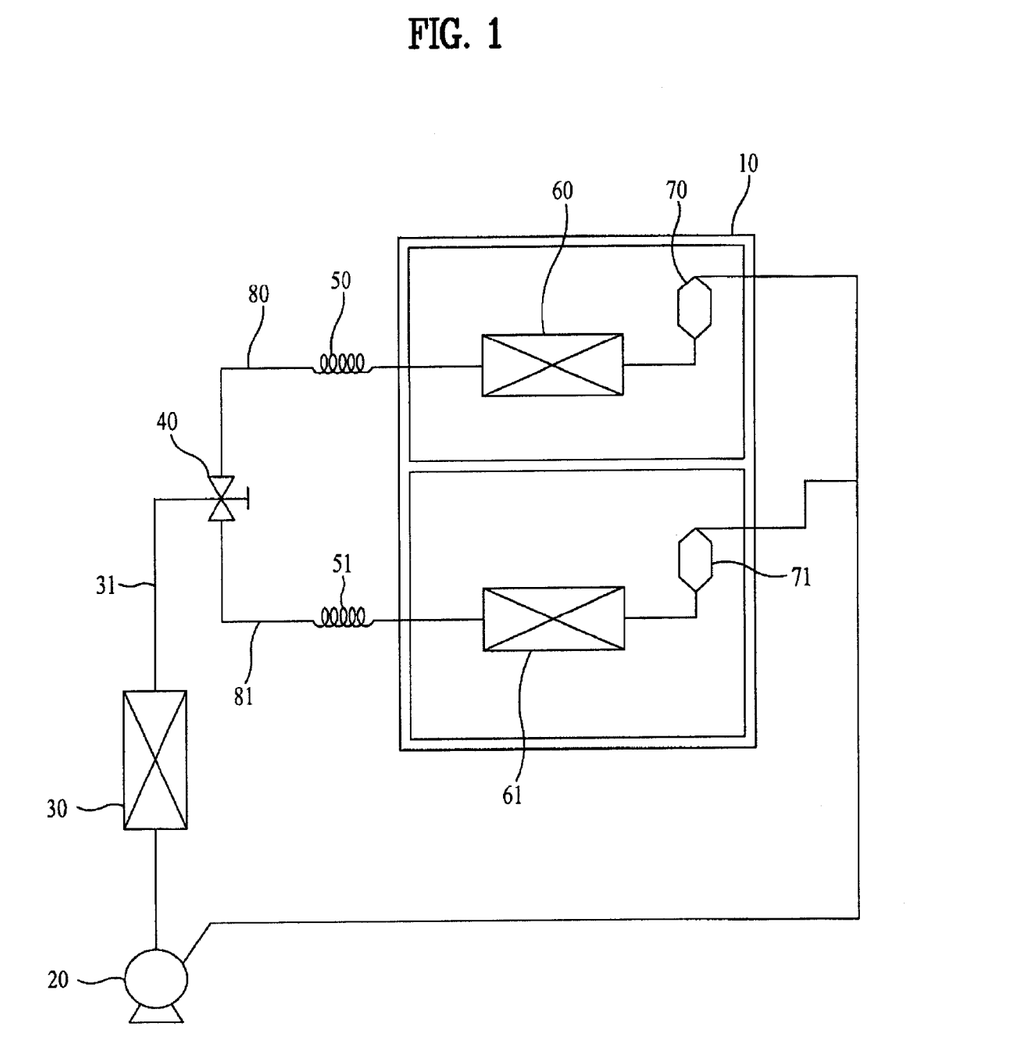
FIG. 1 is a diagram of a refrigerator to which a refrigerator operating method according to the present invention is applied.

FIG. 1 is a diagram of a refrigerator to which a refrigerator operating method according to the present invention is applied.

Referring to FIG. 1, a refrigerator includes a compressor, a condenser, a capillary tube and an evaporator.

A plurality of storerooms are provided within the refrigerator. At least one individual evaporator is provided to each of a plurality of the storerooms. Hence, a temperature of each of the storerooms of the refrigerator can be separately adjusted.

The refrigerator includes a cooling system to cool down a plurality of storerooms.

The cooling system includes a plurality of evaporators 60 and 61 adjusting temperatures of a plurality of the storerooms, respectively, a compressor 20, a condenser 30, a valve 40, evaporators 50 and 51, and a plurality of accumulators 70 and 71 preventing liquid refrigerants discharged from the evaporators 60 and 61 from being introduced into the compressor 20, respectively.

For convenience of explanation, two evaporators 60 and 61 and two accumulators 70 and 71 are provided to the refrigerator for example. Yet, the number of the evaporators and the number of the accumulators can be adjusted suitable for the number of the storerooms provided within the refrigerator. Optionally, a plurality of accumulators can be connected to one evaporator.

In this case, one of the two evaporators 60 is named a first evaporator 60 and the other is named a second evaporator 61.

The accumulator connected to the first evaporator 60 is named a first accumulator 70 and the other accumulator connected to the second evaporator 61 is named a second accumulator 71.

The compressor 20 sucks the refrigerant gas discharged at low pressure from each of the evaporators 60 and 61, compresses the sucked gas into a high-pressure and high-temperature refrigerant gas to blow out.

The refrigerant blown out of the compressor 20 is introduced into the condenser 30. The refrigerant flowing inside the compressor 30 radiates heat outside the condenser 30 to undergo a phase change into a refrigerant of a liquid phase.

And, each of the expanders 50 and 51 plays a role in expanding the refrigerant discharged from the condenser 30 into a low-pressure state.

In the present embodiment, the expander 50 includes a capillary tube 50 provided to an entrance of the evaporator 60. And, the other expander 51 includes a capillary tube 51 provided to an entrance of the evaporator 61.

Each of the evaporators 60 and 61 is installed on a wall of the corresponding storeroom of the refrigerator. And, the evaporator 60 or 61 absorbs heat from air inside the corresponding storeroom to keep a low temperature of an inner space of the corresponding storeroom.

In particular, the low-temperature and low-pressure liquid refrigerant introduced into the evaporator 60 or 61 from the capillary tube 50 or 51 evaporates into a gaseous refrigerant within the corresponding evaporator 60 or 61 to absorb heat from air within the corresponding storeroom. Hence, the inner space of the corresponding storeroom is cooled down.

The valve 40 plays a role in switching a flow of the refrigerant so that the refrigerant can be introduced into the first evaporator 60 and/or the second evaporator 61.

In this case, the valve 40 is preferably provided between the condenser 30 and each of the two evaporators 60 and 61.

In particular, the valve 40 is installed between the condenser 30 and each of the capillary tubes 50 and 51.

For this, a main pipe 31 is connected to an exit end of the condenser 30 to guide the refrigerant discharged from the condenser 30.

And, first and second refrigerant pipes 80 and 81 are connected to entrance ends of the capillary tubes 50 and 51, respectively. In other words, the first and second refrigerant pipes 80 and 81 diverge from the main pipe 31 to guide the refrigerant of the main pipe 31 to the capillary tubes 50 and 51, respectively.

For convenience of explanation, the capillary tube connected to the first refrigerant pipe 80 is named a first capillary tube 50 and the other capillary tube connected to the second refrigerant pipe 81 is named a second capillary tube 51.

The valve 40 is provided to an intersection between the main pipe 31, the first refrigerant pipe 80 and the second refrigerant pipe 81. And, the valve 40 selectively leads the refrigerant discharged from the condenser 30 to the first refrigerant pipe 80 and/or the second refrigerant pipe 81.

In this case, the valve 40 plays a role in leading the refrigerant to either the first refrigerant pipe 80 or the second refrigerant pipe 81 or to both of the first and second refrigerant pipes 80 and 81.

Figure 3A:
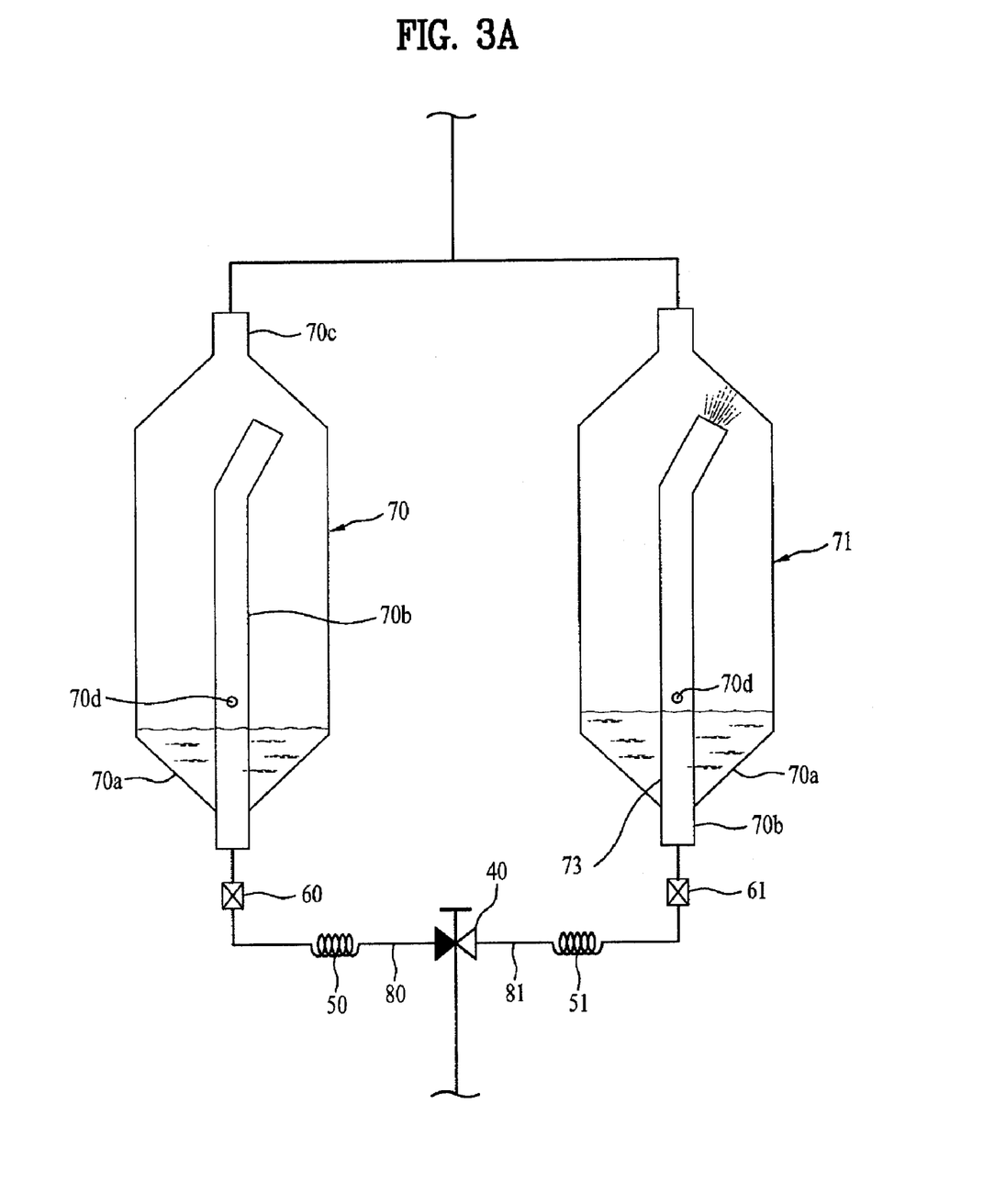
FIG. 3A and FIG. 3B are diagrams of an accumulator of a refrigerator operated by a refrigerator operating method according to one embodiment of the present invention and an accumulator of a refrigerator operated by a comparative method, respectively.
Figure 3B:
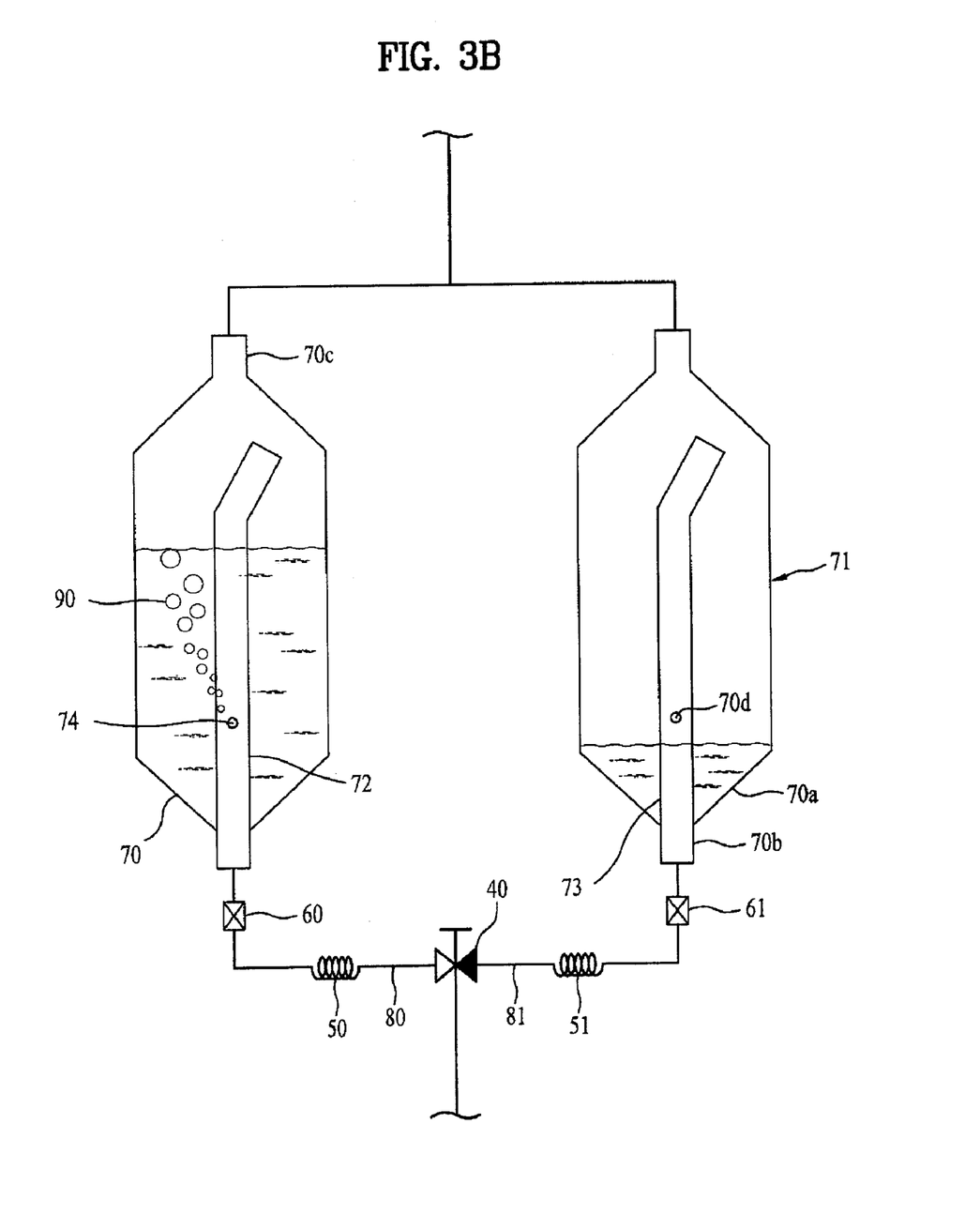

Each of the accumulators 70 and 71, as shown in FIG. 3A and FIG. 3B, includes a hollow housing 70a, an intake pipe 70b connected to the evaporator 60 or 61 to guide the refrigerant to an inside of the housing 70a, and an outlet 70c discharging the gaseous refrigerant separated within the housing 70a to the compressor 20.

In this case, the intake pipe 70 penetrates a lower end of the housing 70a to be inserted into the housing 70a to a prescribed length. And, an oil hole 70d is provided to a prescribed position of the intake pipe 70b to recover an oil mixed with the refrigerant so that the coil can keep circulating.

In other words, the liquid refrigerant among the refrigerant introduced into the housing 70a via the intake pipe 70b is accommodated within the housing 70a and is then vaporized to be provided to the compressor 20.

If the inner space of the housing is charged with a prescribed amount of the oil mixed with the refrigerant, the excessive oil is recovered via the oil hole 70d to circulate together with the refrigerant.

So, once the refrigerator is actuated, the compressor 20 blows the high-temperature and high-pressure refrigerant. The high-temperature and high-pressure refrigerant blown out of the compressor 20 is then introduced into the condenser 30 to be cooled down. Hence, the refrigerant turns into a high-pressure refrigerant of liquid phase.

The refrigerant discharged from the condenser 30 is introduced into the valve 40 along the main pipe 31. And, the valve 40 adjusts a flow of the refrigerant so that the refrigerant can be introduced into at least one of the first and second refrigerant pipes 80 and 81.

In this case, the valve 40 is preferably configured to be controlled by a control unit (not shown in the drawings) of the refrigerator.

The refrigerant flowing along the first or second refrigerant pipe 80 or 81 is abruptly expanded by the corresponding capillary tube 50 or 51 to turn into a low-temperature and low-pressure liquid refrigerant and is then introduced into the first or second evaporator 60 or 61. Hence, the introduced refrigerant evaporates to cool down the corresponding storeroom of the refrigerator 10.

The refrigerant evaporated by the evaporator 60 or 61 is lead to the intake end of the compressor 20 by a sucking force of the compressor 20.

In this case, in order to prevent a compression efficiency of the compressor 20 from being reduced due to the liquid refrigerant sucked into the compressor 20, the liquid refrigerant is filtered off from the refrigerants discharged from the evaporator 60 or 61 by the first or second accumulator 70 or 71. And, the gaseous refrigerant is lead to the compressor 20.

Meanwhile, in case that the first evaporator 60 needs to be driven only, the refrigerant discharged from the condenser 30 is introduced into the first capillary tube 50 only by the valve 40 to expand. The refrigerant discharged from the first capillary tube 50 is introduced into the first evaporator 60 to evaporate.

The refrigerant discharged from the first evaporator 60 passes through the first accumulator 70 and is then introduced into the compressor 20.

Meanwhile, in case that the second evaporator 61 needs to be driven only, the refrigerant discharged from the condenser 30 is introduced into the second capillary tube 51 only by the valve 40 to expand. The refrigerant discharged from the second capillary tube 51 is introduced into the second evaporator 61 to evaporate.

The refrigerant discharged from the second evaporator 61 passes through the second accumulator 71 and is then introduced into the compressor 20.

In case that both of the first and second evaporators 60 and 61 need to be driven, the refrigerant discharged from the condenser 30 diverges from the valve 40 and is then introduced into the first and second capillary tubes 50 and 51 to expand. The refrigerants discharged from the first and second capillary tubes 50 and 51 are introduced into the first and second evaporators 60 and 61 to evaporate, respectively.

The refrigerants discharged from the first and second evaporators 60 and 61 pass through the first and second accumulators 70 and 71, respectively and are then introduced into the compressor 20.

In case that the valve 40 cuts off both of the first and second refrigerant pipes 80 and 81 as the compressor 20 stops being driven, a pressure between the compressor 20 and the condenser 30 is maintained relatively higher than that between the compressor 20 and each of the evaporators 60 and 61.

Once the compressor 20 re-starts to be driven, the valve 40 is turned on the refrigerant of the condenser side at a relatively higher pressure is abruptly introduced into the first refrigerant pipe 80 and/or the second refrigerant pipe 81. So, the refrigerant pipes or the evaporators 60 and 61 are damaged overall or a loud noise is generated in the early stage of driving the compressor. And, the valve 40 may fail in operating due to a pressure difference between entrance and exit of the valve 40.

Hence, the valve preferably keeps being open after the compressor 20 has stopped being driven. Hence, a pressure difference of an overall system is minimized after the compressor 20 has stopped being driven.

If the refrigerant is introduced into either the first evaporator 60 or the second evaporator 61 while the compressor 20 is being driven and if the valve maintains the same state after the compressor 20 has stopped being driven, the accumulator connected to the evaporator, into which the refrigerant was introduced while the compressor was driven, is charged with a massive amount of refrigerant to generate noise.

In other words, if the compressor 20 stops in the course of introducing the refrigerant into the first evaporator 60 only due to the driven compressor, an inside of the first accumulator 70 connected to the first evaporator 60 is charged with an excessive amount of a refrigerant-oil mixed liquid.

In particular, as the refrigerant keeps being supplied to the inside of the first accumulator 70 from the condenser 30 and the first evaporator 60, the oil hole 70d submerges under the liquid refrigerant. As the refrigerant gas keeps being introduced via the intake pipe 70b from the condenser 30, the refrigerant gas spouts from the oil hole 70d.

In this case, the refrigerant gas spouting from the oil hole 70a spouts into the liquid refrigerant filling the inside of the first accumulator 70 to generate bubbles. The bubbles of the refrigerant gas ascends to a surface of the liquid refrigerant filling the inside of the first accumulator 70 to blow up.

If the valve 40 maintains the same state after the compressor 20 has stopped being driven, the noise generated from the bubbles formed in the first accumulator 70 and the noise generated from the blowing-up bubbles continue for a predetermined duration.

If the above-explained operating method is named a comparative method, a state of the accumulator of the refrigerator operated by the comparative method is shown in FIG. 3B.

Figure 4A:
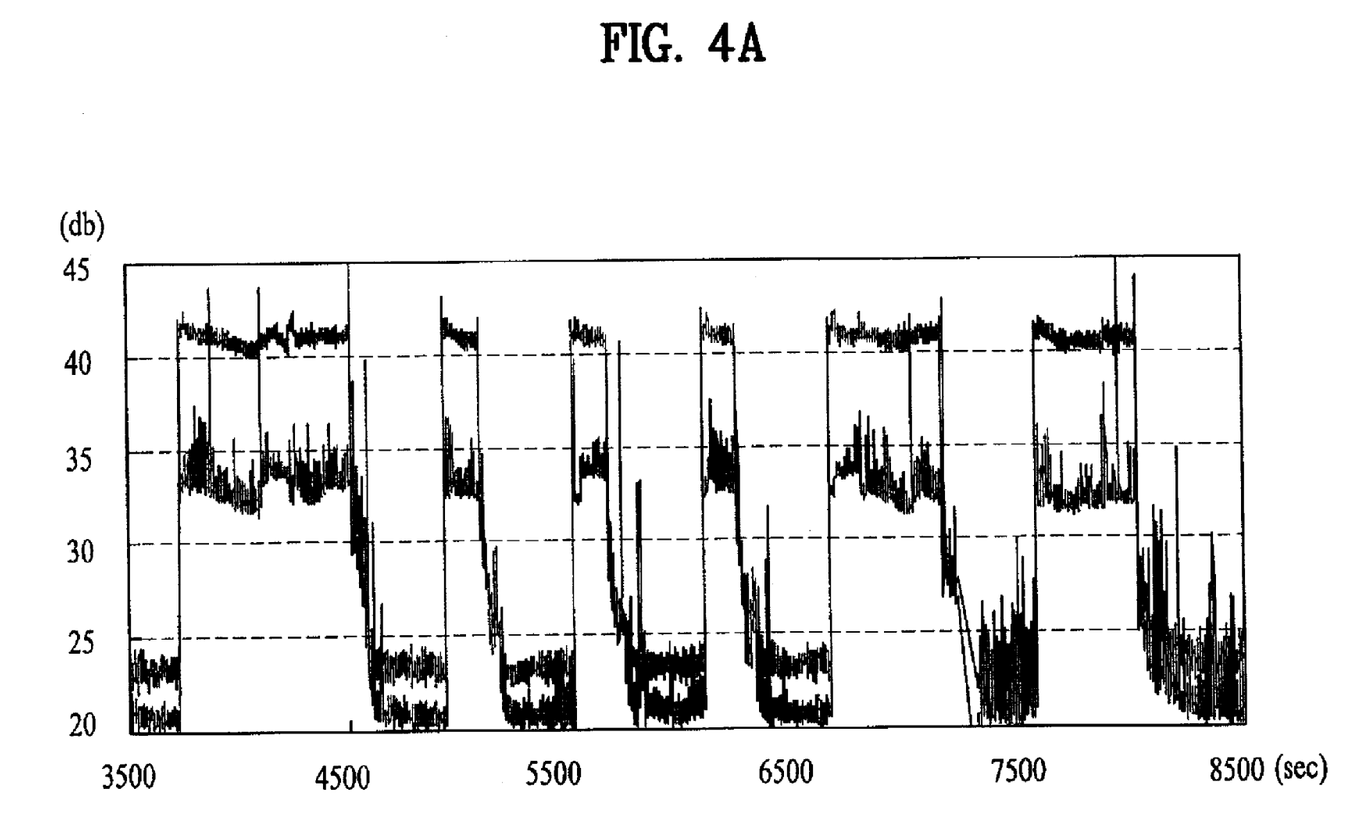
FIG. 4A and FIG. 4B are graphs of noises generated from a refrigerator operating method according to one embodiment of the present invention and a refrigerator operated by a comparative method, respectively.
Figure 4B:
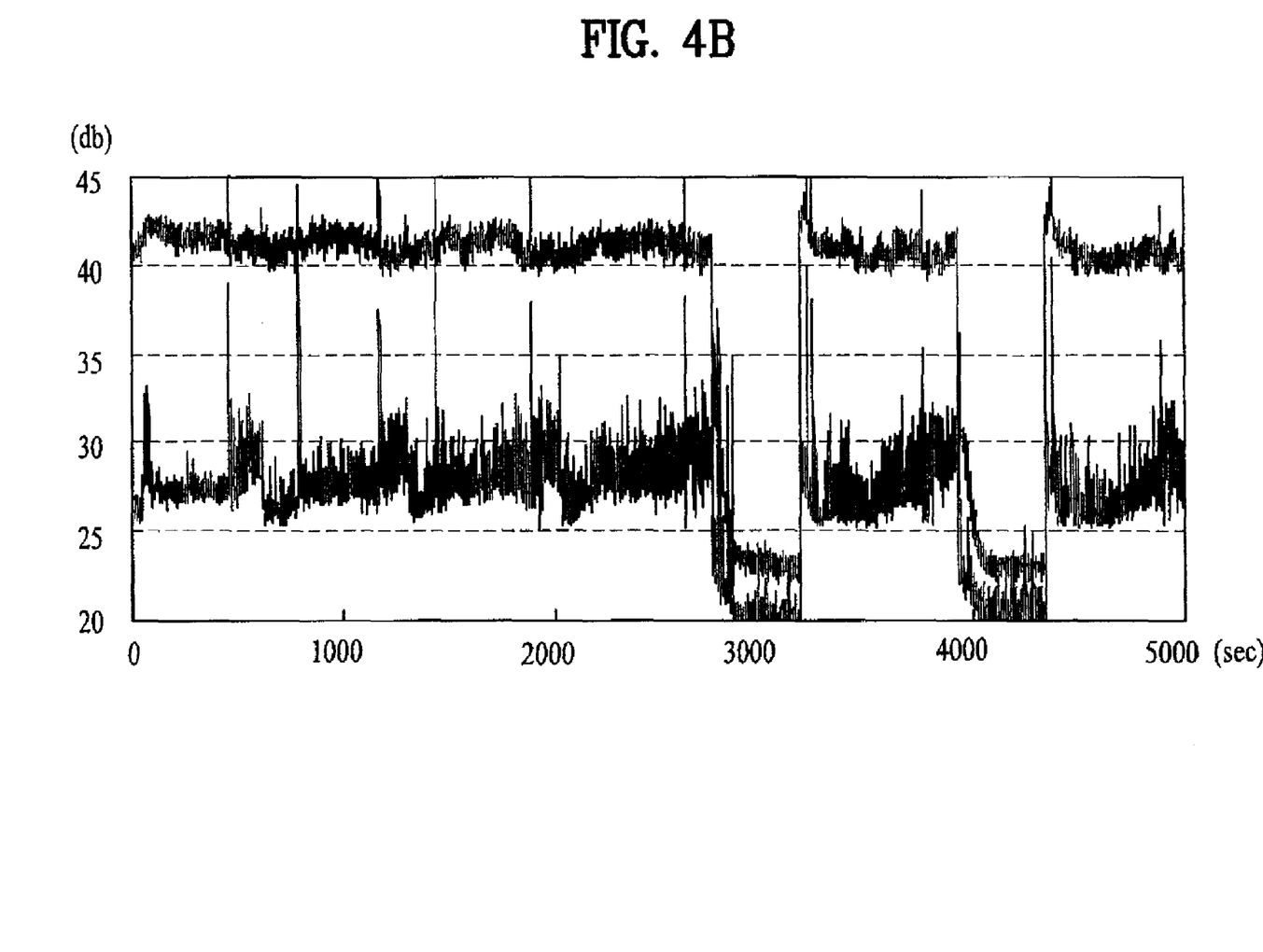

A graph of measuring the noise generated from the refrigerator operated by the comparative method is shown in FIG. 4B, which will be explained later.

The present invention proposes a refrigerator operating method that can minimize the noise generation after deactivating a compressor.

Figure 2:
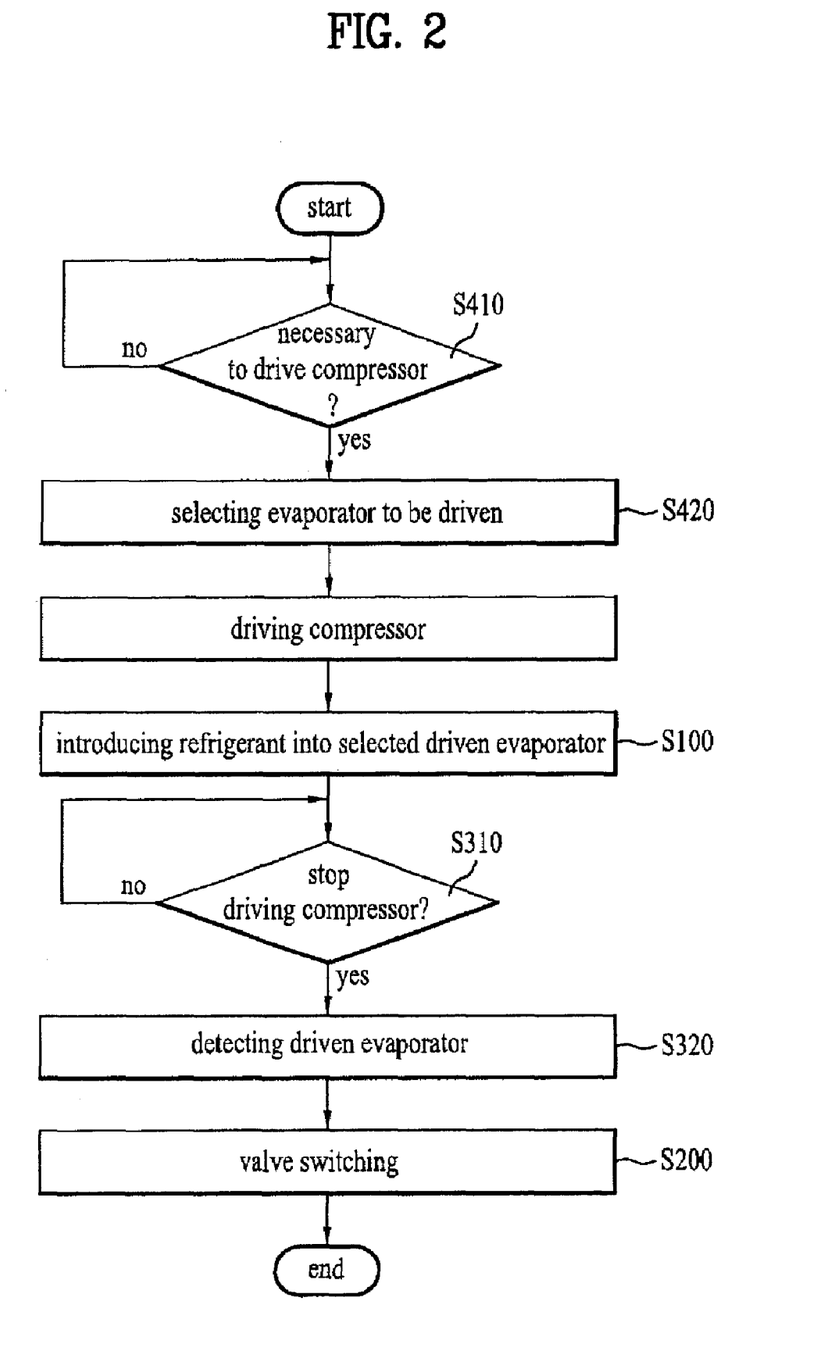
FIG. 2 is a flowchart of a method of operating a refrigerator according to one embodiment of the present invention.

FIG. 2 is a flowchart of a method of operating a refrigerator according to one embodiment of the present invention.

Referring to FIG. 2, a method of operating a refrigerator according to one embodiment of the present invention includes a step (a) of controlling a flow of a refrigerant so that the refrigerant can be introduced into at least one accumulator connected to at least one evaporator selected to be driven (S100) and a step (b) of if the compressor 20 stops being driven, switching the flow of the refrigerant so that the refrigerant can be introduced into at least one different accumulator connected to at least one different evaporator to which the flow of the refrigerant was cut off in the course of driving the compressor 20 (S200).

In this case, the step (b) (S200) is carried out in a manner of enabling the main pipe 31 connected to a discharging end of the condenser 30 to selectively communicate with refrigerant pipes connected to a plurality of the evaporators 60 and 61, respectively.

In other words, the step (b) (S200) can be carried out in a manner of cutting off the refrigerant introduced into the selected evaporator in the course of driving the compressor 20 and opening a passage to the evaporator to which the flow of the refrigerant was cut off in the course of driving the compressor 20.

In particular, the step (b) (S200) includes a step (b1) of cutting off the refrigerant introduced into the selected evaporator in the course of driving the compressor 20 and a step (b2) of opening the passage to the evaporator to which the flow of the refrigerant was cut off in the course of driving the compressor 20.

In the present embodiment, the step (b) (S200) is carried out by the valve 40.

Preferably, the refrigerator operating method according to the present invention further includes a step (c) of deciding whether the compressor 20 stops to control the cooling system more accurately (S310) and a step (d) of detecting the evaporator to which the refrigerant is introduced in the course of driving the compressor (S320).

The refrigerator operating method according to the present invention may further include the steps of deciding whether the compressor 20 is driven by detecting states of a plurality of storerooms provided with the evaporators 60 and 61 (S410) and selecting at least one of the evaporators needing to be driven (S420).

In particular, a temperature sensor (not shown in the drawing) is provided to each of a plurality of the storerooms. If storeroom temperatures detected by the temperature sensors are inputted to the control unit, the control unit decides whether the compressor needs to be driven for temperature adjustment of the storerooms. The control unit selects the evaporator that needs to be driven and then activates the compressor 20. It is a matter of course that the evaporator needing to be driven can be manually selected.

For instance, the control unit of the refrigerator automatically or manually selects the first evaporator 60 only. Once the compressor 20 is driven, the valve 40 adjusts the flow of the refrigerant so that the refrigerant discharged from the condenser 30 can be introduced into the first evaporator 60.

The refrigerant, which is discharged after having been evaporated in the first evaporator 60, is introduced into the first accumulator 70. The gaseous refrigerant is then discharged from the first accumulator 70 to be sucked into the compressor 20.

Subsequently, once the storeroom cooled down by the first evaporator 60 reaches a prescribed temperature, the compressor 20 stops being driven.

In order for the refrigerant, which is discharged from the condenser 30 after the compressor has stopped 20, to be introduced into the second accumulator 71 connected to the second evaporator 61, the valve 40 switches the flow of the refrigerant in a manner of cutting off the first refrigerant pipe 80 and opens the second and opening the second refrigerant pipe 81.

In this case, the refrigerant within the second evaporator 61 is almost evaporated while the second evaporator 61 stops. And, a refrigerant-oil mixed liquid over a prescribed amount remains within the second accumulator 71. Hence, the refrigerant discharged from the condenser 30 is introduced into the second accumulator 71 only.

As a small amount of the refrigerant is introduced into the second accumulator 71, the second accumulator 71 is charged with a small amount of the refrigerant for a prescribed time only so that the oil hole 70 does not submerge under the refrigerant. Hence, the noise generation attributed to bubbles can be prevented.

A graph of noise generated from a refrigerator operated by the refrigerator operating method according to the present invention is shown in FIG. 4A. And, a graph of noise generated from a refrigerator operated by the comparative method is shown in FIG. 4B.

Each of the graphs shown in FIG. 4A and FIG. 4B indicates a noise 9 dB) for a driven time (sec) of a refrigerator. In FIG. 4A or FIG. 4B, a line marked on an upper part of the graph indicates a noise measured in rear of the refrigerator and a line marked on a lower part of the graph indicates a noise measured in front of the refrigerator.

A part that a level of noise abruptly falls indicates a noise measured for a time of stopping driving the compressor 20.

The noise measured in rear of the refrigerator is higher than that measured in rear of the refrigerator. This is because the compressor 20 and the accumulators 70 and 71 are provided to a mechanic room provided to a rear part of the refrigerator.

Referring to FIG. 4A and FIG. 4B, it can be seen from the refrigerator operating method according to the present invention that the noise, which is generated for a predetermined time right after the compressor has stopped, is considerably reduced. This is because the noise attributed to the bubbles is minimized.

Meanwhile, at least one of the storerooms can be configured as a ripening storeroom that plays a role in ripening food. In other words, the refrigerator can be configured to ripen food such as 'Kimchi' of Korean fermented food. This refrigerator is called 'Kimchi Refrigerator' in Korea.

In particular, in case of the 'Kimchi Refrigerator', at least one storeroom is configured to preserve 'Kimchi' and another storeroom is configured to preserve vegetable and/or meat.

In this case, a ripening heater is provided within the cabinet to ripen food such as 'Kimchi' and the like.

The above-configured 'Kimchi Refrigerator' is controlled suitable for usages of the storerooms. Hence, it may frequently happen that a plurality of the evaporators are driven in part.

So, the refrigerator operating method according to the present invention is more effective to the refrigerator having the ripening storeroom.

Accordingly, the present invention provides the following effects or advantages.

First of all, the present invention lowers the noise generated from the refrigerator, thereby reducing unpleasantness caused to a user.

Secondly, the present invention minimizes the pressure difference generated in an overall cooling system after the compressor has stopped. Hence, the cooling system can be prevented from being damaged.

Thirdly, as the evaporator needing to be driven is selected according to the state of the corresponding storeroom, the present invention minimizes the energy consumption of the refrigerator.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of operating a refrigerator, comprising:
   a step (a) of controlling a flow of a refrigerant so that the refrigerant can be introduced into at least one accumulator connected to at least one evaporator selected to be driven; and
   a step (b) of if a compressor stops being driven, switching the flow of the refrigerant so that the refrigerant can be introduced into at least one different accumulator connected to at least one different evaporator to which the flow of the refrigerant was cut off in the course of driving the compressor.

2. The method of claim 1, further comprising:
   a step (c) of deciding whether the compressor stops; and
   a step (d) of detecting the evaporator to which the refrigerant is introduced in the course of driving the compressor.

3. The method of claim 1, wherein the step (b) is carried out by a valve provided between a condenser and each of a plurality of the evaporators to switch the flow of the refrigerant.

4. The method of claim 3, wherein the step (b) is carried out in a manner of enabling a pipe connected to a discharging end of the condenser to selectively communicate with another pipes connected to intake ends of a plurality of the evaporators, respectively.

5. The method of claim 1, wherein the step (b) is carried out in a manner of cutting off the refrigerant introduced into the selected evaporator in the course of driving the compressor and opening a passage to the evaporator to which the flow of the refrigerant was cut off in the course of driving the compressor.

6. The method of claim 5, the step (b) comprising:
   a step (b1) of cutting off the refrigerant introduced into the selected evaporator in the course of driving the compressor; and
   a step (b2) of opening the passage to the evaporator to which the flow of the refrigerant was cut off in the course of driving the compressor.

7. The method of claim 1, further comprising the steps of:
   deciding whether the compressor is driven by detecting states of a plurality of storerooms provided with the evaporators prior to the step (a); and
   selecting at least one of the evaporators needing to be driven.

8. A method of operating a refrigerator, which includes a plurality of storerooms wherein at least one of a plurality of the storerooms is a ripening storeroom storing food to be ripened, the method comprising:
   a step (a) of controlling a flow of a refrigerant so that the refrigerant can be introduced into at least one accumulator connected to at least one evaporator adjusting a temperature of at least one of a plurality of the storerooms; and
   a step (b) of if a compressor stops being driven, switching the flow of the refrigerant so that the refrigerant can be introduced into at least one different accumulator connected to at least one different evaporator to which the flow of the refrigerant was cut off in the course of driving the compressor.

9. The method of claim 8, further comprising:
   a step (c) of deciding whether the compressor stops; and
   a step (d) of detecting the evaporator to which the refrigerant is introduced in the course of driving the compressor.

10. The method of claim 8, wherein the step (b) is carried out by a valve provided between a condenser and each of a plurality of the evaporators to switch the flow of the refrigerant.

11. The method of claim 10, wherein the step (b) is carried out in a manner of enabling a pipe connected to a discharging end of the condenser to selectively communicate with another pipes connected to intake ends of a plurality of the evaporators, respectively.

12. The method of claim 8, wherein the step (b) is carried out in a manner of cutting off the refrigerant introduced into the selected evaporator in the course of driving the compressor and opening a passage to the evaporator to which the flow of the refrigerant was cut off in the course of driving the compressor.

13. The method of claim 12, the step (b) comprising:
   a step (b1) of cutting off the refrigerant introduced into the selected evaporator in the course of driving the compressor; and
   a step (b2) of opening the passage to the evaporator to which the flow of the refrigerant was cut off in the course of driving the compressor.

14. The method of claim 8, further comprising the steps of:
   deciding whether the compressor is driven by detecting states of a plurality of storerooms provided with the evaporators prior to the step (a); and
   selecting at least one of the evaporators needing to be driven.

* * * * *